(12) United States Patent
Lau et al.

(10) Patent No.: US 10,558,863 B2
(45) Date of Patent: Feb. 11, 2020

(54) VIDEO SURVEILLANCE SYSTEM AND VIDEO SURVEILLANCE METHOD

(71) Applicant: PEGATRON CORPORATION, Taipei (TW)

(72) Inventors: Tze-Yee Lau, Taipei (TW); Chin-Yu Ko, Taipei (TW); Cheng-Chou Chen, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 15/985,714

(22) Filed: May 22, 2018

(65) Prior Publication Data

US 2019/0026564 A1    Jan. 24, 2019

(30) Foreign Application Priority Data

Jul. 19, 2017    (TW) .............................. 106124081 A (51) Int. Cl.
| | | |
|---|---|---|
| G06K 9/00 | (2006.01) | |
| H04N 5/247 | (2006.01) | |
| H04N 7/18 | (2006.01) | |
| H04N 5/232 | (2006.01) | |

(52) U.S. Cl.
CPC ..... *G06K 9/00771* (2013.01); *G06K 9/00718* (2013.01); *H04N 5/23218* (2018.08); *H04N 5/247* (2013.01); *H04N 7/181* (2013.01); *G06K 2009/00738* (2013.01)

(58) Field of Classification Search
None
See application file for complete search history.

(56) References Cited

U.S. PATENT DOCUMENTS

| | | | |
|---|---|---|---|
| 2007/0223808 A1* | 9/2007 | Kerr ................... | G06K 9/00771 382/159 |
| 2008/0193010 A1 | 8/2008 | Eaton et al. | |
| 2008/0294588 A1* | 11/2008 | Morris ............... | G06K 9/00295 706/47 |

(Continued)

FOREIGN PATENT DOCUMENTS

| | | |
|---|---|---|
| CN | 101622652 | 1/2010 |
| CN | 106096789 | 11/2016 |
| TW | 200725490 | 7/2007 |

(Continued)

*Primary Examiner* — Fernando Alcon
(74) *Attorney, Agent, or Firm* — J.C. Patents (57) ABSTRACT

A video surveillance method and a video surveillance system applied the method are provided. The method includes capturing an image of at least a part of a monitored area to obtain a plurality of video streams; sensing the monitored area to obtain a plurality of sensing data; if an image of an object of a video stream is determined as a target object, determining whether the target object triggers a target event according to one of the sensing data corresponding to the video stream; if the target object is determined as triggering the target event, outputting a feature value corresponding to the target object according to a preset analysis condition, the video stream including the target object and the target event; and generating a notification event corresponding to the target object according to the feature value and a model weight value corresponding to the target object.

20 Claims, 4 Drawing Sheets

(56) References Cited

U.S. PATENT DOCUMENTS

2010/0026801 A1\* 2/2010 Williams ........... G06K 9/00711
348/135
2017/0169296 A1 6/2017 Hsieh et al.

FOREIGN PATENT DOCUMENTS

| TW | M403711 | 5/2011 |
| TW | M464777 | 11/2013 |
| TW | 201432633 | 8/2014 |
| TW | 201721473 | 6/2017 |

\* cited by examiner

VIDEO SURVEILLANCE SYSTEM AND VIDEO SURVEILLANCE METHOD

CROSS-REFERENCE TO RELATED APPLICATION

This application claims the priority benefit of Taiwan application serial no. 106124081, filed on Jul. 19, 2017. The entirety of the above-mentioned patent application is hereby incorporated by reference herein and made a part of this specification.

BACKGROUND

Field of the Invention

The invention relates to a surveillance system and more particularly, to a video surveillance system and a video surveillance method.

Related Art

Generally, in a conventional image or video surveillance system, in and out of any object are monitored only by eyes of security guards or factory personnel to determine whether any unreasonable event occurs to the object, so as to make corresponding decisions. However, in a condition that the recognition is performed only by eyes, a plurality of objects as well as various events which may occur in correspondence to the objects cannot be efficiently processed simultaneously.

In light of the foregoing, how to design a video/image surveillance system and a video/image surveillance method capable of efficiently processing a plurality of objects and various events which may occur in correspondence to the objects is a goal that the persons of this field devote themselves to develop.

SUMMARY

The invention provides a video surveillance system and a video surveillance method capable of recognizing whether there is a target object according to a plurality of video streams with respect to a monitored area captured by a plurality of video capture devices and a plurality of sensing devices, determining whether the target object triggers a target event by using sensing data corresponding to the video streams, and then generating a notification event corresponding to the target object according to the target object and the triggered target event through a plurality of analysis models, so as to determine whether to perform subsequent warning operation, display operation, verification operation or control operation according to the determined notification event. With the disposition of the video surveillance system, a monitoring efficiency for the monitored area can be enhanced.

According to an embodiment of the invention, a video surveillance system for monitoring a monitored area is provided. The system includes a video capture module, a sensing module and a decision system. The video capture module includes a plurality of video capture devices. The video capture devices are respectively disposed adjacent to the monitored area, and each of the video capture devices is configured to capture an image including at least a part of the monitored area to obtain a video stream. The sensing module includes a plurality of sensing devices. The sensing devices are respectively disposed adjacent to the corresponding video capture devices, and each of the sensing devices senses the monitored area to obtain sensing data. The plurality of sensing data respectively correspond to the video streams output by the video capture devices. The decision system is coupled to the video capture module and the sensing module. The decision making system includes an image recognition module, an event determination module, an analysis model module and a processing module. The image recognition module receives the video streams of the video capture devices and determines whether an image of an object fitting a target object exists in each of the video streams. The event determination module is coupled to the image recognition module and receives the plurality of sensing data of the sensing devices. If the image recognition module determines the image of the object in the video stream as the target object, the event determination module determines whether the target object in the video stream triggers a target event according to the sensing data corresponding to the video stream. The analysis model module is coupled to the image recognition module and the event determination module. The analysis model module includes a plurality of analysis models respectively corresponding to the video capture devices, and each of the analysis models includes a preset analysis condition. If determining that the target object in the video stream triggers the target event, the event determination module transmits the video stream including the target object and the target event to the analysis model corresponding to the video capture device belonging to the video stream. The analysis models respectively output a plurality of feature values corresponding to the target object according to the respective preset analysis conditions, the video stream including the target object received by each of the analysis models and the target event. The processing module is coupled to the analysis model module. The processing module has a plurality of model weight values respectively corresponding to the analysis models. Additionally, the processing module is configured to receive the feature values corresponding to the target object output by the analysis models and generate the notification event corresponding to the target object according to the feature values corresponding to the target object and the model weight values corresponding to the analysis models.

According to an embodiment of the invention, a video surveillance method adapted for a video surveillance system is provided. The video surveillance method includes the following steps. An image of at least a part of the monitored area is captured to obtain a plurality of video streams. The monitored area is sensed to obtain a plurality of sensing data, wherein the plurality of sensing data respectively correspond to the video streams. Whether an image of an object fitting a target object exists in each of the video streams is determined. If the image of the object in the video stream is determined as the target object, whether the target object in the video stream triggers a target event is determined according to the sensing data corresponding to the video stream. If the target object in the video stream is determined as triggering the target event, a feature value corresponding to the target object is output according to a preset analysis condition, the video stream including the target object and the target event. A notification event corresponding to the target object is generated according to the feature value and a model weight value corresponding to the target object.

To sum up, in the video surveillance system and the video surveillance method provided by embodiments of the invention, the target objects in the video streams captured from the monitored area can be recognized, whether the target object triggers the target event can be determined according to the sensing data corresponding to each of the video streams, the aforementioned data are input into a plurality of analysis models, and the feature values corresponding to the target object are obtained according to the preset analysis conditions, so as to generate the notification event corresponding to the target object according to the feature values and the model weight values respectively corresponding to the analysis models. In this way, the controlling, warning and verification operations can be performed on the monitored area according to the notification event, thereby achieving efficient and flexible monitoring management.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF THE EMBODIMENTS

Figure 1:
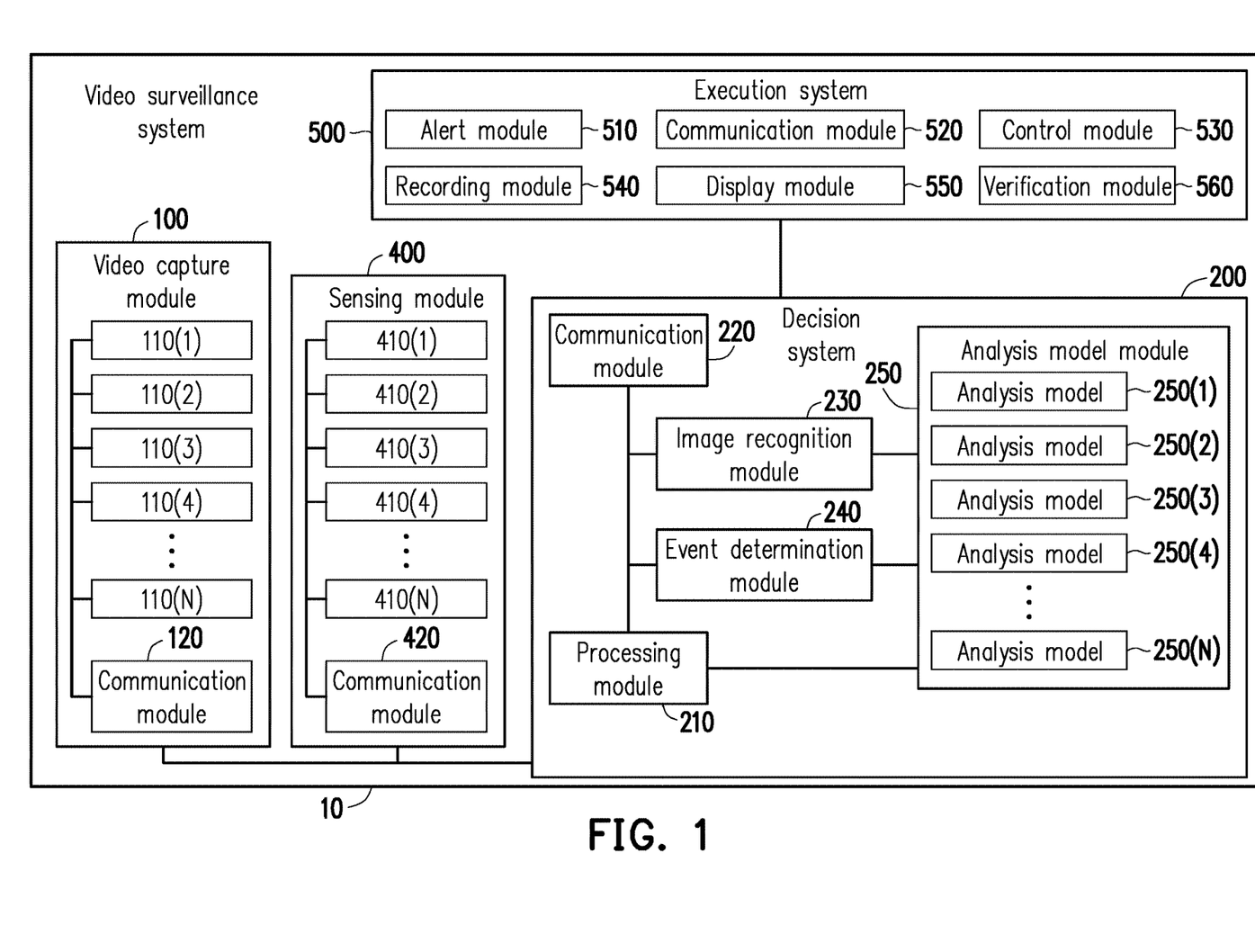
FIG. 1 is a block diagram illustrating a video surveillance system according to an embodiment of the invention.
Figure 2:
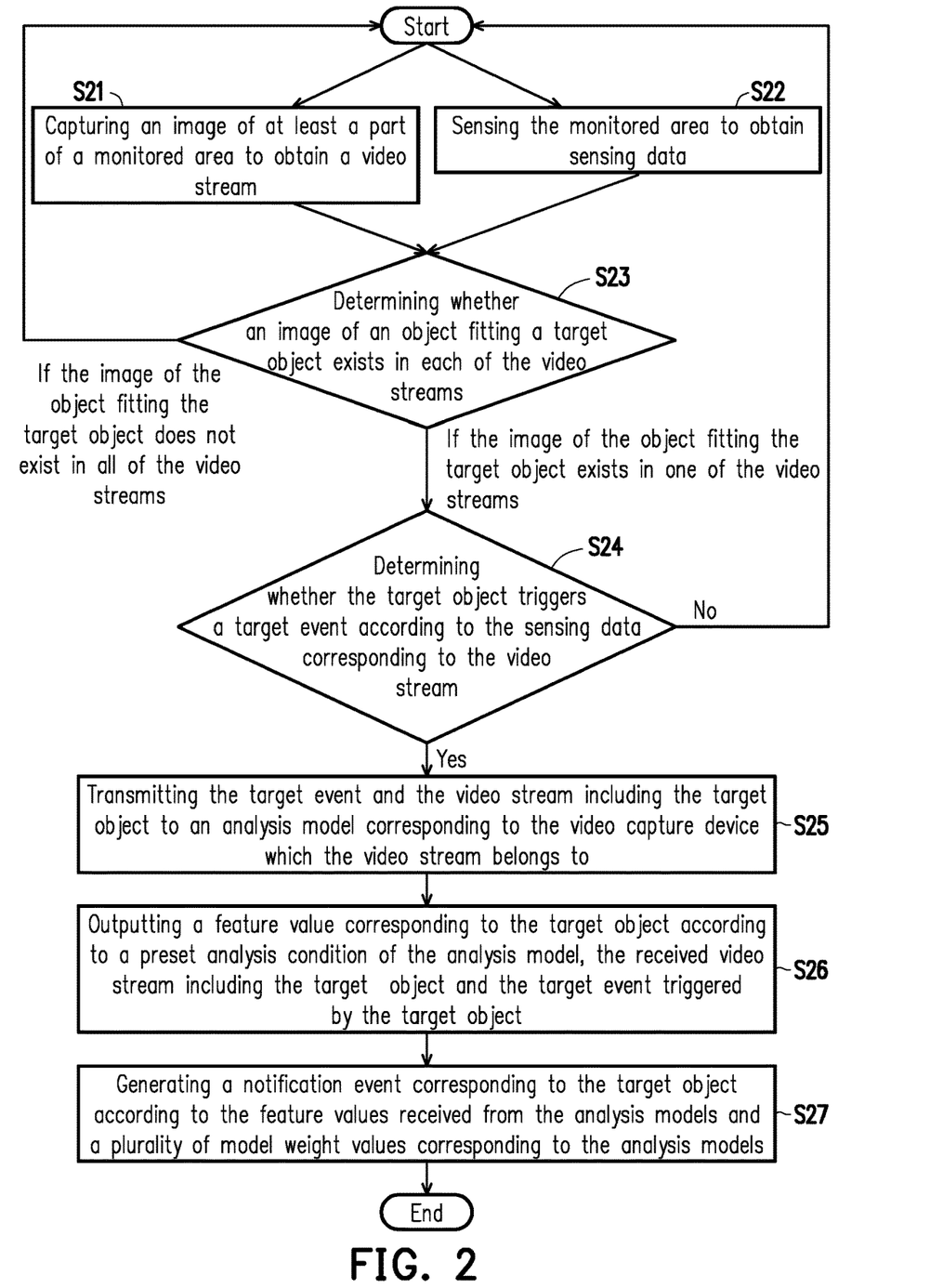
FIG. 2 is a flowchart illustrating a video surveillance method according to an embodiment of the invention.

FIG. 1 is a block diagram illustrating a video surveillance system according to an embodiment of the invention. Referring to FIG. 1, in the present embodiment, a video surveillance system 10 includes a video capture module 100, a decision system 200 and a sensing module 400. The decision system 200 is coupled to the video capture module 100 and the sensing module 400. FIG. 1 first introduces all the components and the disposition of the video surveillance system 10, and FIG. 2 is a flow chart of an image scaling method according to one embodiment of the present invention. The method of the present embodiment is applicable to the video surveillance system 10 illustrated in FIG. 1. Each device in the video surveillance system 10 together with detailed steps of the video surveillance method of the invention will be described with reference to FIG. 1 and FIG. 2 simultaneously.

The video capture module 100 includes a plurality of video capture devices 110(1) to 110(N) (which may also be image capture devices, video cameras or cameras capable of capturing image data) and a communication module 120. Each of the video capture devices 110(1) to 110(N) is configured to capture an image of at least a part of a monitored area to obtain a video stream (step S21), wherein N is a positive integer. The monitored area refers to an area monitored by the video surveillance system 10. The monitored area may include one or more areas. Each of the video capture devices may include a lens, a photosensitive element, an aperture and so on. The lens is, for example, a standard lens, a wide-angle lens, a zoom lens or the like. The photosensitive element is, for example, a charge coupled device (CCD), a complementary metal-oxide semiconductor (CMOS) device or any other device, lens and photosensitive element or a combination thereof, which is not limited in the invention. Each of the video capture devices may continuously capture a plurality of images, i.e., capture (obtain) a dynamic image (which is also referred to as a video stream). Each of the video capture devices may also capture a single static image. The video capture devices 110(1) to 110(N) are respectively disposed adjacent to the monitored area, and the different video capture devices 110(1) to 110(N) face the monitored area and capture images including at least parts of the monitored area in different angles, thereby obtaining video streams. For example, in a case where the video surveillance system 10 is disposed on a vehicle, the monitored area may refer to a space surrounding the vehicle. Additionally, in another case where the video surveillance system 10 is disposed at a factory gate, the monitored area may refer to a space surrounding the gate. In other words, the video surveillance system and the video surveillance method of the invention, as implied in the name, performs monitor and control management on videos (images) of a concerned monitored area which are simultaneously captured in various angles using various video capture devices.

The communication module 120 is coupled to the video capture devices 110(1) to 110(N), and the video capture module 100 may transmit (output) the captured video streams through the communication module 120. For example, the communication module 120 may be connected with the video capture module 100 and the decision system 200 through a wireless or a wired network connection, but the invention is not limited thereto.

The sensing module 400 includes a plurality of sensing devices 410(1) to 410(N) and a communication module 420. The sensing devices 410(1) to 410(N) are respectively disposed adjacent to the corresponding video capture devices 110(1) to 110(N). Each of the sensing devices 410(1) to 410(N) is configured to sense the monitored area to obtain sensing data (step S22). The sensing devices 410(1) to 410(N) are, for example, infrared sensors, gravity sensors, proximity sensors, radiation sensors, laser sensors, light sensors, thermal sensors and so on, but the invention is not limited thereto. In the present embodiment, the sensing data obtained by the sensing devices corresponds to the video streams output by the video capture devices. However, in an embodiment, the number of the sensing devices may be less than the number of the video capture devices, and one sensing data may correspond to multiple video streams. In an embodiment, the number of the sensing devices may be greater than the number of the video capture devices, and multiple sensing data may correspond to one video stream. The communication module 420 is coupled to the video capture devices 410(1) to 410(N), and the video capture module 400 may transmit (output) the obtained multiple sensing data through the communication module 420. For example, the communication module 420 may be connected with the decision system 200 and the video capture module 400 through a wireless or a wired network connection.

The decision making system 200 includes a processing module 210, a communication module 220, an image recognition module 230, an event determination module 240 and an analysis model module 250.

The image recognition module 230 is coupled to the communication module 220 and the processing module 210 and may receive the video streams captured by the video capture devices 110(1) to 110(N) through the communication modules 120 and 220 for performing an image recognition operation. The image recognition module 230 is configured to determine whether an image of an object fitting a target object exists in each of the video streams (step S23). For example, the image recognition module 230 may perform the image recognition operation on each of the video streams by means of machine learning. The image recognition module 230 may determine whether the image of the object fitting the target object exists in each of the video streams according to a preset target object type and classify each of the objects. For instance, if an image including a human, a gate and a data capture machine appears in a video stream, the image recognition module 230 may recognize that there is an image including three objects in the video stream and classify the three objects, thereby classifying the three objects respectively into a "human" type, a "control device" type and a "verification device" type. Then, the image recognition module 230 may determine whether the type belonging to each of the objects fits a preset target object type according to the preset target object type. If the type belonging to one of the objects conforms to the preset target object type, the image recognition module 230 may determine the object as the target object (i.e., the image of the object fitting the target object exists in the video stream). If none of the types belonging to the objects conforms to the preset target object type, the image recognition module 230 determines that none of the objects are the target object (i.e., no images of the objects fitting the target object exist in the video stream). For instance, in case the preset target object type is the "human" type, if the image recognition module 230 determines that a type of one of the objects in the image of the video stream belongs to the "human" type, the image recognition module 230 may determine the object as the target object. In an embodiment, the image recognition module 230 may also, through an image database, directly recognize identity information of the target object according to the image of the target object (for example, directly perform human face recognition on the target object which is a human, thereby recognizing a name or a code of the target object). The aforementioned identity information of the target object may be transmitted to the processing module 210, so as to be recorded to a subsequently generated notification event.

The event determination module 240 is coupled to the image recognition module 230, the processing module 210 and the communication module 220. The event determination module 240 is configured to receive the sensing data of the sensing devices 410(1) to 410(N). If the image recognition module 230 determines that an image of an object fitting the target object exists in a video stream (i.e., the image recognition module 230 determines the image of the object in the video stream as the target object), the event determination module 240 determines whether the target object in the video stream triggers a target event according to the sensing data corresponding to the video stream (step S24). Additionally, if the event determination module 240 determines that the target object in the video stream triggers the target event, the event determination module 240 starts to accumulate a duration in which the target event continuously exists as a target event time.

For instance, it is assumed that an object (e.g., a human body) enters a monitored area (e.g., a gate), each of the video capture device has captured a video stream including at least a part of the human body and outputs the video stream to the image recognition module. The image recognition module determines that an image of the human body in the video stream belongs to the target object according to a preset target object type (for example, the preset target object type is the "human" type), and the sensing devices are infrared sensors disposed near the monitored area (i.e., the gate) and located near positions of the video capture devices. When the image recognition module determines the image of the human body as the target object, the infrared sensors corresponding to the video capture devices transmit the sensing data that the human body (i.e., the target object) is sensed to the event determination module 240. The event determination module 240 determines whether the human body (i.e., the target object) which is located near the gate (i.e., the monitored area) triggers a target event according to the sensing data of the infrared sensors. In other words, the sensing data corresponding to the video streams received by the event determination module 240 may be employed to determine whether the target object in the video stream triggers the target event.

Because the event determination module 240 determines that "there is a human body located near the gate" as belonging to the aforementioned target event, the event determination module 240 may start to accumulate a duration in which the target event (i.e., "the human body is located near the gate") continuously exists as a target event time. By contrast, if the event determination module 240 determines that the target object does not trigger the target event, the event determination module 240 does not perform the duration accumulation corresponding to the target object.

It should be noted that if no video stream including the object fitting the target object exists in all the video streams after step S23 is completed (i.e., if none of the images of the objects in the video streams is the target object), step S21 is returned to, and steps S21 and S22 are again performed. If an image of an object in one or more of the video streams is determined as the target object, step S24 follows to determine whether the target object in the one or more of the video streams triggers the target event.

The analysis model module 250 is coupled to the image recognition module 230, the event determination module 240 and the processing module 210, the analysis model module 250 includes a plurality of analysis models 250(1) to 250(N) respectively corresponding to the video capture devices 110(1) to 110(N), and each of the analysis models 250(1) to 250(N) includes a preset analysis condition, wherein the number of the analysis models 250(1) to 250(N) is at least equal to the number of the video capture devices 110(1) to 110(N). In the present embodiment, if the event determination module 240 determines that the target object in one of the video streams triggers the target event (the video stream including the target object triggering the target event is obtained through one of the video capture devices), the event determination module 240 transmits the target event and the video stream including the target object to the analysis model corresponding to the video capture device belonging to the video stream (step S25). For instance, it is assumed that the target object is recognized from the video stream obtained by the video capture device 110(1). If the event determination module 240 determines that the target object triggers the target event, the event determination module 240 transmits the video stream including the target object and the target event to the analysis model 250(1) corresponding to the video capture device 110(1).

In the present embodiment, if one of the analysis models 250(1) to 250(N) receives the video stream including the target object and the target event, the analysis model outputs a feature value corresponding to the target object according to a preset analysis condition of the analysis model, the received video stream including the target object and the target event triggered by the target object (step S26). For instance, following the example set forth above, the analysis model 250(1) which receives the video stream including the target object and the target event outputs the feature value corresponding to the target object according to the received video stream and the target event. In other words, when the target object of one of the video streams triggers the target event, the analysis model corresponding to the video stream calculates or determines the feature value according to the video stream and its corresponding target event, thereby outputting the feature value corresponding to the target object.

In other embodiments, the analysis models 250(1) to 250(N) may further output a plurality of feature values corresponding to the target object according to respective preset analysis conditions, the video streams including the target object respectively received from the corresponding video capture devices, the triggered target event corresponding to the target object and the target event time corresponding to the target event.

To be more detailed, the video capture devices which are set up in different angles are disposed with the corresponding analysis models (in a one-to-one relationship) in the present embodiment. In this way, through the corresponding analysis models, the calculation of a plurality of feature values are performed on the video streams captured by different video capture devices in different angles and corresponding monitoring data (each of the analysis models analyzes the image of the target object in the received video stream and the target event triggered by the target object to calculate or determine the feature values through the preset analysis condition of the analysis model), thereby collocating different analysis models adaptively according to different monitoring characteristics with respect to the monitored area which are to be concerned by difference video capture devices, such that the feature values obtained through the analysis models may be more accurate.

The analysis model module 250 transmits the output feature values to the processing module 210, such that the processing module 210 may determine according to the received feature values to generate a notification event corresponding to the target object. Specifically, the processing module 210 has a plurality of model weight values respectively corresponding to the analysis models. The processing module 210 may generate the notification event corresponding to the target object according to the feature values received from the analysis models and the model weight values corresponding to the analysis models (step S27). To be more detailed, the processing module 210 multiplies the received feature value corresponding to each of the analysis models by the model weight value corresponding to each of the analysis models, thereby obtaining a weighted feature value corresponding to each of the analysis models (i.e., multiplies the feature value received from one of the analysis models by the model weight value corresponding to the analysis model), thereby obtaining the weighted feature value corresponding to the analysis model. And, the processing module 210 sums up a plurality of weighted feature values to obtain a feature value sum and determines the notification event according to the feature value sum. In brief, the processing module 210 first weights the received feature values according to the corresponding model weight values and sums up all the weighted feature values, so as to obtain the feature value sum.

It is to be mentioned that in the present embodiment, different model weight values may represent reference values of the feature values generated by different analysis models. In other words, the greater the model weight value is, the greater reference value the generated feature value has.

To be more specific, the processing module 210 may compare the feature value sum with one or more decision thresholds to determine the corresponding notification event according to the value comparison relationship between the feature value sum and the decision thresholds. For instance, if the feature value sum is greater than a first decision threshold, the processing module 210 may determine a first notification event, and if the feature value sum is less than or equal to the first decision threshold, the processing module 210 may determine a second notification event.

The notification event may be employed to indicate a value of a degree of danger which influences the monitored area by the current target object (which may range from "100" indicating the most dangerous degree to "0" indicating the safest degree, for example). The notification event may further include operating instructions (e.g., a control instruction for controlling an external device, i.e., the "gate") applied to a security system (e.g., an execution system below) and information records (e.g., the target object corresponding to the notification event and related reference data of the target event) corresponding to the degree of danger. The information records may be recorded by the execution system. The related reference data includes, for example, identification information corresponding to the target object and an existence duration/the target event time of the target event.

The corresponding relationship between the model weight values and the analysis models is a one-to-one relationship, i.e., one of the model weight values only corresponds to one of the analysis models (for example, the first model weight value corresponds to the first analysis model 250(1), and the second model weight value corresponds to the second analysis model 250(2). Additionally, in an embodiment, after generating the notification event corresponding to the target object, the processing module 210 may adjust the model weight value corresponding to each of the analysis models 250(1) to 250(N) according to the notification event, the feature values output by the analysis models and a feedback signal corresponding to the notification event. The feedback signal is, for example, a signal input by a management personnel of the video surveillance system, which is employed to assist in adjusting the model weight value corresponding to each of the analysis models. In another embodiment, the feedback signal may, by means of machine learning, adjust the model weight value corresponding to each of the analysis models according to the feature value output by each of the analysis models and the currently generated notification event.

Additionally, in another embodiment, the video surveillance system 10 may further include an execution system 500 (which is also referred to as a security system). The execution system 500 is coupled to the decision system 200. In the present embodiment, the execution system 500 includes an alert module 510, a communication module 520, a control module 530, a recording module 540, a display module 550 and a verification module 560. The execution system 500 may be connected with the decision system 200 through a wireless or a wired network connection between the communication module 520 and the communication module 220.

The alert module 510 is coupled to the processing module 210 and configured to determine whether to issue an alert according to the received notification event. The alert includes a message alert, a sound alert, a light alert or other types of alerts, but the invention is not limited thereto. For instance, if the notification event corresponding to the target object determined by the processing module 210 is a "violation" notification event (for example, the value indicating the degree of danger which influences the monitored area by the current target object is "100"), the alert module 510 issues an alert sound, flashing light and/or an alert message to notify relevant personnel (e.g., security guards) that the target object appearing in the monitored area has a violation event. In an embodiment, the alert module 510 may, according to the "violation" event, directly transmit a corresponding video stream (which may be attached with a red fame by the display module) to a monitoring device (e.g., a mobile device or a computer terminal equipped with a display) of the security personnel and transmit a corresponding alter message and information related to the monitored area (e.g., identification information, a time, a location of the monitored area and/or identity information of the target object triggering the target event) to the monitoring device. Furthermore, if the notification event corresponding to the target object determined by the processing module 210 is an "alert" notification event (for example, the value indicating the degree of danger which influences the monitored area by the current target object is "60"), the alert module 510 may issue a prompt sound and issue a prompt message to notify the relevant personnel to take action for alert preparedness toward the target object currently appearing in the monitored area. Furthermore, if the notification event corresponding to the target object determined by the processing module 210 is a "safe" notification event (for example, the value indicating the degree of danger which influences the monitored area by the current target object is "0"), the alert module 510 does not issue any alert/prompt.

The alert module 530 is coupled to the processing module 210 and configured to control the external device according to the received notification event. For instance, it is assumed that an object (e.g., a human body) enters a monitored area (e.g., a gate). As the human body is determined as the target object, and the sensing data of the infrared sensors that there is a human body currently near the gate is determined as triggering a target event, if the processing module 210 determines a notification event corresponding to the human body as a "violation" notification event and transmits the "violation" notification event to the execution system 500 through the communication module 520 and the communication module 220, the execution system 500 may output a control signal to the control module 530 according to the notification event, such that the control module 530 may control the corresponding gate (with may be considered as the external device in the present embodiment) to be closed and locked according to the control signal.

The recording module 540 is configured to record the video streams output by the video capture module 100, the plurality of sensing data output by the sensing module 400, the notification event corresponding to the target object of the decision system 200, the target event triggered by the target object and the corresponding target event time. For example, the management personnel of the video surveillance system may access the recorded video streams by using the recording module 540 base on demands, so as to view images in the monitored area during a specific time period. The management personnel of the video surveillance system may collect and read specific events and corresponding reference data through the recording module 540. Additionally, the recording module 540 may be any type of device capable of storing data. In other embodiments, the recording module 540 may also be disposed in the decision system 500.

The display module 550 is configured to display the video streams captured by the video capture devices. Additionally, the display module 550 may display a pattern at a position corresponding to the target object in a corresponding video stream according to the notification event generated by the processing module 210. For instance, for a target object conforming to a "violation" notification event, the display module 550 may display a red frame pattern at a position corresponding to the target object in a corresponding video stream (a video stream including the target object). For a target object conforming to an "alert" notification event, the display module 550 may display a yellow frame pattern at a position corresponding to the target object in a corresponding video stream. For a target object conforming to a "safe" notification event, the display module 550 may display a green frame pattern at a position corresponding to the target object in a corresponding video stream (or may not display any pattern at the position corresponding to the target object in the corresponding video stream). It should be noted that the shapes and the colors of the displayed patterns corresponding to different notification events are not limited in the invention.

The verification module 560 includes an identification information database. The identification information database records a plurality of identification information, and the verification module 560 may be a device for identity verification (e.g., a data capture machine for access control). The verification module 560 performs a verification procedure to determine whether verification information received thereby matches one of the plurality of identification information in the identification information database. If the verification information is determined as matching one of the identification information, the verification module 560 transmits a verification success message to the event determination module 240, thereby stopping the event determination module 240 from accumulating the target event time. Otherwise, if the verification information is determined as not matching any one of the plurality of identification information, the verification module 560 may transmit a verification failure message to the event determination module 240 and the alert module 510 through the communication module 520. The implementation of the verification procedure is not limited in the present invention. For instance, it is assumed that the verification module 560 is a data capture machine at the gate. When the data capture machine receives verification information recorded in a identification card, the data capture machine performs the verification procedure to compare the verification information with all the identification information in the identification information database, thereby determining whether the verification information matches one of the identification information in the identification information, database and further determining whether the target object passes the verification procedure. Furthermore, for example, it is assumed that the verification module 560 is a cipher lock of a gate. When a string of ciphers (verification information) is input into the cipher lock, the cipher lock performs a verification procedure to compare the ciphers with all the identification information in the identification information database (one or more preset ciphers recorded in the identification information database), thereby determining whether the ciphers match one of the preset ciphers in the identification information database and further determining whether the target object passes the verification procedure. It is to be mentioned that in an embodiment, if the identity information of the target object is identified by the image recognition module, the verification module 560 may also perform a further verification procedure by comparing the identity information (which may be recorded in the notification event) with the received verification information.

It should be noted that in other embodiments, the execution system 500 may also be integrated in the decision system 200. Namely, all the modules of the execution system 500 may also be configured in the decision system 200. Additionally, in other embodiments, the video capture module 100 and the sensing module 400 may also be integrated in the decision system 200.

In an embodiment, the video surveillance system 10 may further include a time synchronization module (not shown). The time synchronization module may synchronize local times of the video capture devices 110(1) to 110(N), the sensing devices 410(1) to 410(N), the decision system 200 and the execution system 500. For instance, the time synchronization module may perform a time synchronization operation according to a network time protocol (NTP). In this way, all operations of the components in the video surveillance system 10 may be synchronized based on the same local time, such that time errors generated in the determination/control may be reduced, thereby increasing the accuracy of the processing module 210 in determining the triggered target event and further accurately accumulating the target event time corresponding to the triggered target event.

It is to be mentioned that in each of the embodiments of the invention, the communication module (e.g., the communication modules 120, 220, 420 and 520) are configured to transmit data through the connections established among one another. In the present embodiment, the communication modules may transmit or receive data by means of wireless communication. For instance, each of the communication modules may have a wireless communication module (not shown) and support one of the following, including the global system for mobile communication (GSM) system, the personal handy-phone system (PHS), the code division multiple access (CDMA) system, the wireless fidelity (WiFi) system, the worldwide interoperability for microwave access (WiMAX) system, the third generation of wireless communication technology (3G), the long term evolution (LTE), the infrared transmission and the bluetooth communication technology or a combination thereof, which is not limited in the invention. Besides, each of the communication modules may also have a wired communication module (not shown) and transmit or receive data by means of wired communication. For instance, the communication module 220 may be an optical network module and connected with the communication module 520 through an optical fiber interface and optical fibers. In the established optical network, the video capture module 100, the sensing module 400, the decision system 200 and the execution system 500 may deliver data/messages to one another. The type and the material of the optical fibers are not limited in the invention. In an embodiment, the optical fibers may be used in combination with power lines.

Figure 3:
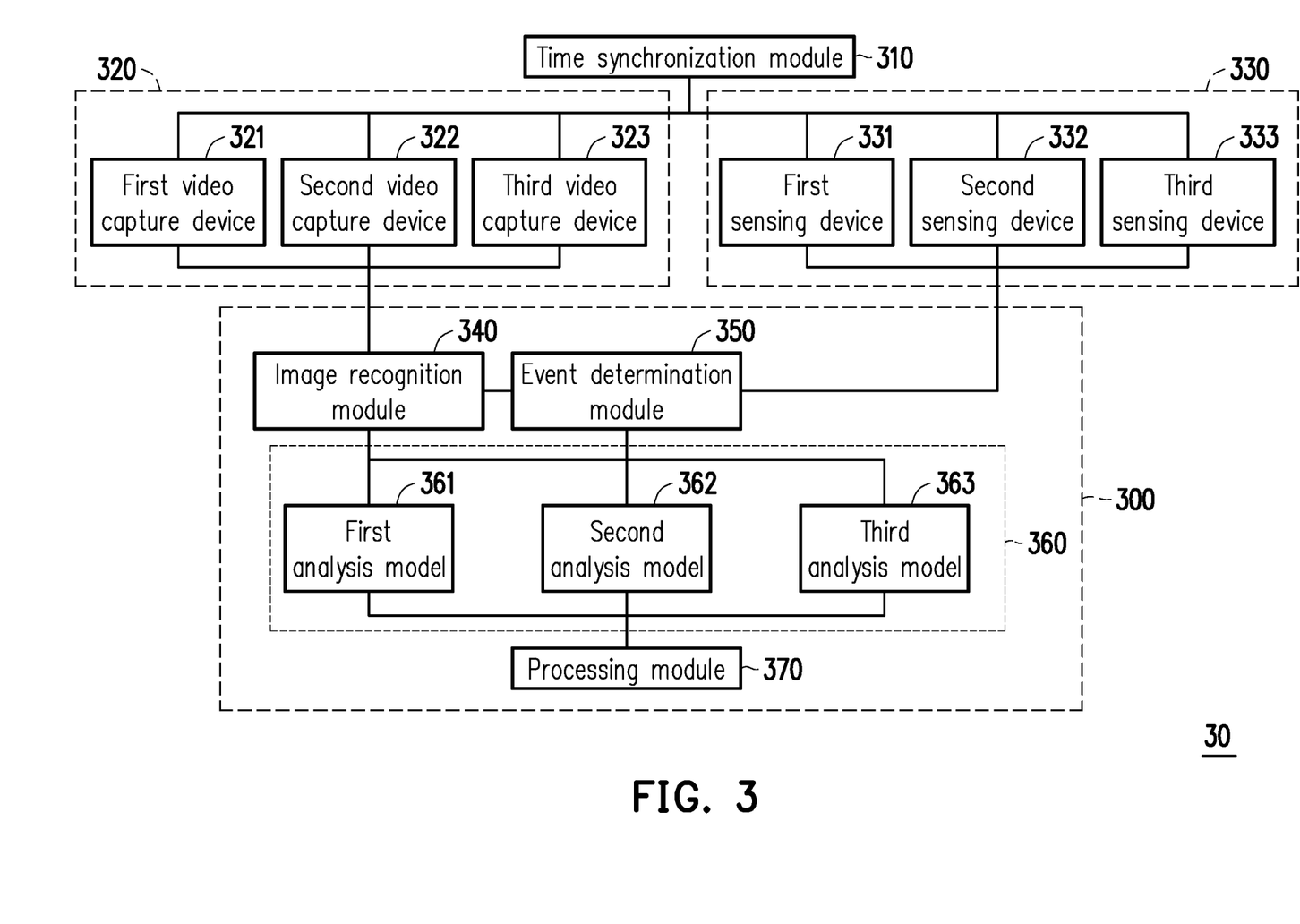
FIG. 3 is a block diagram illustrating a video surveillance system according to another embodiment of the invention.
Figure 4:
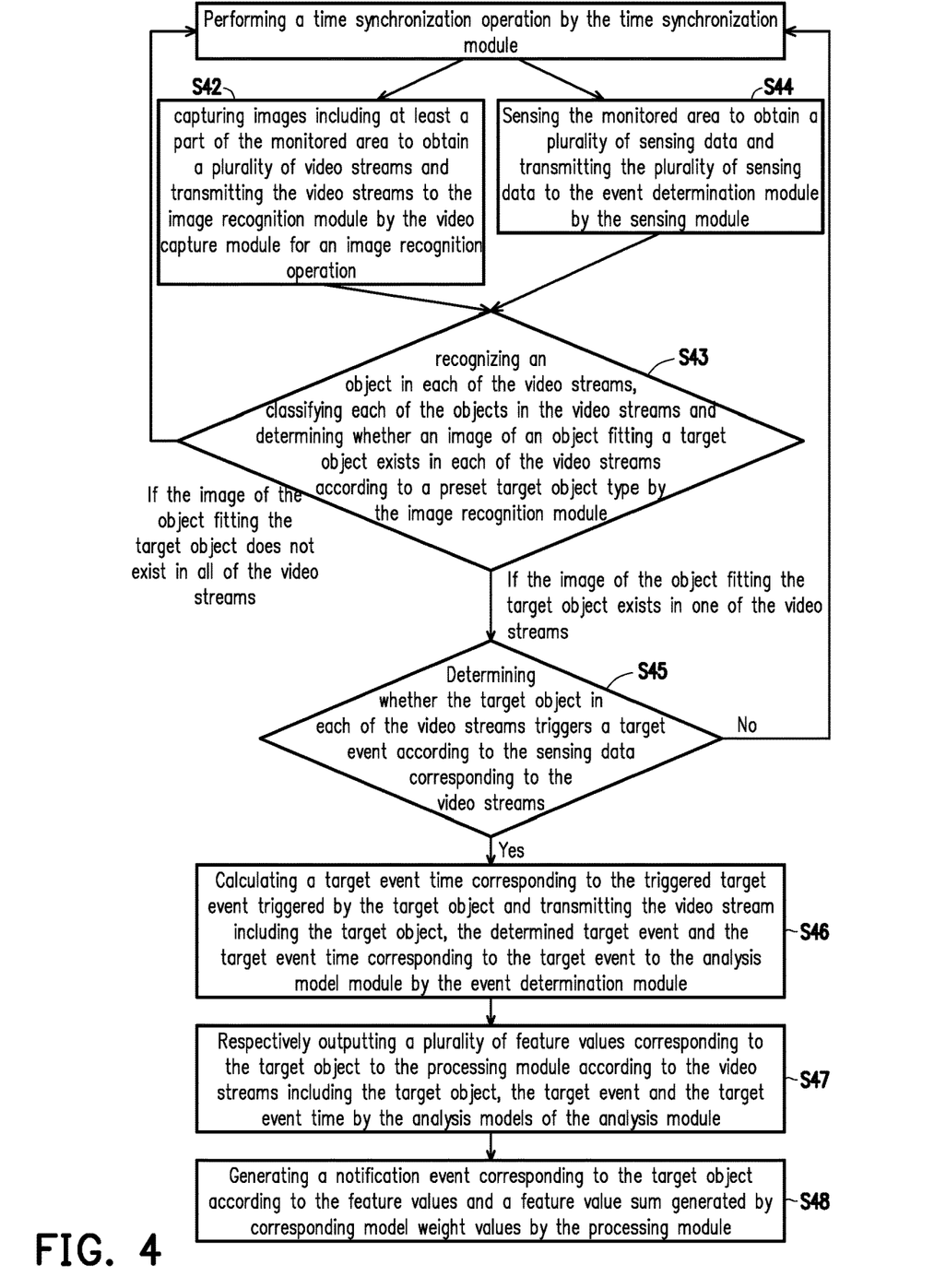
FIG. 4 is an operational flowchart illustrating a video surveillance method according to another embodiment of the invention.

The video surveillance system provided by the invention will be described in another aspect with reference to FIG. 3 and FIG. 4. FIG. 3 is a block diagram illustrating a video surveillance system according to another embodiment of the invention. FIG. 4 is an operational flowchart illustrating a video surveillance method according to another embodiment of the invention.

Referring to FIG. 3, for instance, in another embodiment, it is assumed that a video capture module 320 of a video surveillance system 30 includes three video capture devices (for example, a first video capture device 321, a second video capture device 322 and a third video capture device 323), and a sensing module 330 includes three sensing devices (for example, a first sensing device 331, a second sensing device 332 and a third sensing device 333) corresponding to the three video capture devices (which are disposed in a peripheral area around the video capture devices). A decision making system 300 includes an image recognition module 340, an event determination module 350, an analysis model module 360 and a processing module 370. The decision making system 300 is coupled to the video capture module 320 (where the image recognition module 340 is directly coupled to the video capture module 320) and the sensing module 330 (where the event determination module 350 is directly coupled to the sensing module 330). The image recognition module 340 and the event determination module are coupled to the analysis model module 360, and the processing module 370 is coupled to the analysis model module 360. In addition, a time synchronization module 310 is coupled to the video capture module 320 and the sensing module 330. Referring to both FIG. 3 and FIG. 4, in the beginning, the time synchronization module 310 performs a time synchronization operation (step S41) to synchronize local times of the video capture devices 321 to 323, the sensing devices 331 to 333 and the decision system 200. It should be noted that step S41 described above may also be omitted. For example, in yet another embodiment, each component of the video surveillance system 30 continuously use the same standard local time value. For example, each component is coupled to the same local clock or the same network clock.

Then, each of the first video capture device 321, the second video capture device 322 and the third video capture device 323 faces toward the monitored area and captures an image including at least a part of the monitored area to obtain a video stream. The first video capture device 321, the second video capture device 322 and the third video capture device 323 transmit the obtained video streams (for example, the first video capture device 321 outputs a first video stream, the second video capture device 322 outputs a second video stream, and the third video capture device 323 outputs a third video stream) to the image recognition module 340 for an image recognition operation (step S42). Next, the image recognition module 340 recognizes an object in each of the video streams, classifies each of the objects in the video streams and determines whether an image of an object fitting a target object exists in each of the video streams according to a preset target object type (step S43). In the meantime, the first sensing device 331, the second sensing device 332 and the third sensing device 333 respectively sense the monitored area to obtain first sensing data, second sensing data and third sensing data and transmit the plurality of sensing data to the event determination module 350 (step S44).

In this example, it is assumed that the image recognition module 340 determines that each of the objects in the video streams is the target object. However, in another example, in step S43, the the image recognition module 340 determines that the image of each of the objects in the video streams is not the target object, and the operation process continues to step S41.

If the image recognition module 340 determines that the image of each of the objects in the video streams is the target object, the event determination module 350 determines whether the target object in each of the video streams triggers a target event according to the sensing data corresponding to the video streams (step S45). For instance, the event determination module 350 determines whether the target object in the first video stream triggers the target event according to the first sensing data corresponding to the first video stream. In this example, it is assumed that for all of the first, the second and the third video streams, the event determination module 350 determines that the target object in each of the first, the second and the third video streams triggers the target event. The event determination module 350, if determining that the target event is triggered, calculates a target event time corresponding to the triggered target event and transmits the video stream including the target object, the determined target event and the target event time corresponding to the target event to the analysis model module 360 (step S46). Namely, the first, the second and the third video streams and the corresponding target event are respectively transmitted to a plurality of analysis models 361, 362 and 363 corresponding to the plurality of video capture devices which the first, the second and the third video streams respectively belong to. In another example, in step S45, the event determination module 350 determines that the target event is not triggered (i.e., no target event is triggered), and the operation process continues to step S41.

In the present embodiment, after the first, the second and the third video stream and the corresponding target event are transmitted to the analysis models 361, 362 and 363, the video streams including the target object, the target event, the target event time (or reference data related to the target object/target event) are respectively input into the first analysis model 361 corresponding to the first video capture device 321, the second analysis model 362 corresponding to the second video capture device 322 and the third analysis model 363 corresponding to the third video capture device 323, such that the the first analysis model 361, the second analysis model 362 and the third analysis model 363 respectively output a first feature value (which is output by, for example, the first analysis model 361), the second feature value and the third feature value corresponding to the target object to the processing module 370 (step S47). Then, the processing module 370 generates a notification event corresponding to the target object according to the feature value, the second feature value and the third feature value and a feature value sum generated by corresponding model weight values (step S48). In this way, as described above, the generated notification event may be further used for subsequent monitor and control management (for example, by transmitting the generated notification event to the execution system).

It should be noted that after generating the notification event, the processing module 370 performs a feedback operation according to to the determined notification event, the feature values output by the analysis models and a feedback signal corresponding to the notification event, thereby adjusting the model weight value corresponding to each of the analysis models. In other words, with the feedback operation, the processing module 370 is capable of generating more model weight values which are closer to the feature values of the notification event for the analysis models or generating less model weight values which are less close to the feature values of the notification event for the analysis models. In this way, for monitored areas in different environments, the video surveillance system and the video surveillance method provided by the present embodiment may dynamically adjust the model weight values corresponding to the analysis models, such that the analysis models with more accuracy may more influence the determination (generation) result of the final notification event. It is to be mentioned that the three video capture devices, the three sensing devices and the three analysis models are used in the above-described embodiment for example, however, the number of the video capture devices, the sensing devices and the analysis models are not limited to three. Additionally, the operation process of generating each notification event by the video surveillance system 30 may be considered as starting from the component on the top (e.g., the time synchronization module) to the component on the bottom (e.g., the processing module) in FIG. 3. Namely, each notification event generated in step S48 has to go through steps S41 to S47 performed formerly, and the video surveillance system 30 repeatedly performed steps S41 to S48 to continuously monitor one or more monitored areas corresponding to the video surveillance system.

Based on the above, in the video surveillance system and the video surveillance method provided by embodiments of the invention, the target objects in the video streams captured from the monitored area, the target event triggered by the target objects, the corresponding target event time or other reference data corresponding to the target objects can be recognized, and the recognized reference data are input into the analysis models to obtain a plurality of feature values, so as to generate the notification event according to the model weight values and the feature values respectively corresponding to the analysis models. In this way, the control, the alert and the display operations for the monitored area can be further performed according to the generated notification event, thereby achieving efficient and flexible monitoring efficiency management. Additionally, with the feedback operation, the model weight values can be further adjusted by means of the feedback of each determined notification event, so as to make subsequently determined notification events more accurate Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A video surveillance system, for monitoring a monitored area, comprising:
    a plurality of video capture devices, wherein the video capture devices are respectively disposed adjacent to the monitored area, and each of the video capture devices is configured to capture an image including at least a part of the monitored area to obtain a video stream;
    a plurality of sensing devices, wherein the sensing devices are respectively disposed adjacent to the corresponding video capture devices, and each of the sensing devices senses the monitored area to obtain sensing data, wherein the plurality of sensing data respectively correspond to the video streams output by the video capture devices; and
    a processor, coupled to the video capture devices and the sensing devices, wherein the processor is configured to execute instructions to implement a video surveillance method, the video surveillance method comprises:
    receiving, by the processor, the video streams of the video capture devices and determining whether an image of an object fitting a target object exists in each of the video streams;

receiving, by the processor, the plurality of sensing data of the sensing devices, wherein if the processor determines the image of the object in the video stream as the target object, the processor determines whether the target object in the video stream triggers a target event according to the sensing data corresponding to the video stream;

if determining, by the processor, that one or more target objects in one or more video streams triggers the target event, the processor transmits the one or more video streams including the one or more target objects and the target event to one or more analysis models corresponding to one or more video capture devices belonging to the one or more video streams among a plurality of analysis models corresponding to the plurality of video capture devices, outputting one or more feature values corresponding to the one or more target objects according to one or more preset analysis conditions of the one or more analysis models, the one or more video streams and the target event; and generating a notification event corresponding to the one or more target objects according to the one or more feature values and one or more model weight values respectively corresponding to the one or more feature values.

2. The video surveillance system according to claim 1, wherein the image recognition modulo processor determines whether the image of the object fitting the target object exists in each of the video streams according to a preset target object type.

3. The video surveillance system according to claim 2, wherein if determining that the target object in the video stream triggers the target event, the processor starts to accumulate a duration in which the target event continuously exists as a target event time, wherein the processor further outputs the one or more feature values according to the preset analysis conditions respective corresponding to the one or more analysis models, the video stream, the target event and the target event time corresponding to the target event.

4. The video surveillance system according to claim 3, wherein the processor multiplies the one or more feature values corresponding to the one or more analysis models respectively by the one or more model weight values corresponding to the one or more analysis models, thereby obtaining one or more weighted feature values corresponding to the one or more analysis models, and the processor sums up the one or more weighted feature values to obtain a feature value sum, so as to generate the notification event according to the feature value sum.

5. The video surveillance system according to claim 4, wherein the processor adjusts the one or more model weight value corresponding to the one or more analysis models according to the notification event, the one or more feature values and a feedback signal corresponding to the notification event.

6. The video surveillance system according to claim 3, wherein:

the processor controls an external device according to the received notification event.

7. The video surveillance system according to claim 6, wherein the processor couples to a recording device configured to record the notification event corresponding to the one or more target objects, the target event triggered by the one or more target objects and the target event time corresponding to the target event.

8. The video surveillance system according to claim 6, wherein the processor displays the one or more video streams of the one or more video capture devices on a display and displays a pattern on a position corresponding to the one or more target objects in the one or more video streams according to the notification event.

9. The video surveillance system according to claim 6, wherein the processor determines whether to issue an alert according to the received notification event.

10. The video surveillance system according to claim 6, wherein the processor couples to a verification device, the verification module device comprises an identification information database, and the identification information database records a plurality of identification information, wherein if the target event occurs, the verification device performs a verification procedure to determine whether verification information received by the verification device matches one of the identification information, and if determining that the verification information matches the one of the identification information, the verification device transmits a verification success message to the processor, thereby stopping the processor from accumulating the target event time.

11. A video surveillance method, adapted for a video surveillance system to monitor a monitored area, the video surveillance method comprising:

capturing an image of at least a part of the monitored area to obtain a plurality of video streams;

sensing the monitored area to obtain a plurality of sensing data, wherein the plurality of sensing data respectively correspond to the video streams;

determining whether an image of an object fitting a target object exists in the video streams;

if the image of the object in the video stream is determined as the target object, determining whether the target object triggers a target event according to the sensing data corresponding to the video stream;

if one or more target objects in one or more video streams are determined as triggering the target event, outputting one or more feature values corresponding to the one or more target objects according to one or more preset analysis conditions of one or more analysis models corresponding to one or more video capture devices belonging to the one or more video streams among a plurality of analysis models corresponding to the plurality of video capture devices, the one or more video streams and the target event; and generating a notification event corresponding to the one or more target objects according to the one or more feature values and one or more model weight values respectively corresponding to the one or more feature values.

12. The video surveillance method according to claim 11, wherein the step of determining whether the image of the object fitting the target object exists in the video streams comprises:

determining whether the image of the object fitting the target object exists in the video streams according to a preset target object type.

13. The video surveillance method according to claim 12, further comprising:

if the one or more target objects in the one or more video streams are determined as triggering the target event, starting to accumulate a duration in which the target event continuously exists as a target event time, and further respectively outputting the one or more feature values corresponding to the one or more target objects according to the one or more preset analysis conditions, the one or more video streams, the target event and the target event time corresponding to the target event.

14. The video surveillance method according to claim 13, wherein the step of generating the notification event corresponding to the one or more target objects according to the one or more feature values and one or more model weight values respectively corresponding to the one or more feature values comprises:

multiplying the one or more feature values corresponding to the one or more target objects by the corresponding one or more model weight values, thereby obtaining one or more weighted feature values, and summing up the one or more weighted feature values to obtain a feature value sum, so as to generate the notification event according to the feature value sum.

15. The video surveillance method according to claim 14, further comprising:

adjusting the corresponding one or more model weight values according to the notification event, the one or more feature values and a feedback signal corresponding to the notification event.

16. The video surveillance method according to claim 13, further comprising:

controlling an external device according to the received notification event.

17. The video surveillance method according to claim 13, further comprising:

recording the notification event corresponding to the one or more target objects, the target event triggered by the one or more target objects and the target event time corresponding to the target event.

18. The video surveillance method according to claim 13, further comprising:

displaying the one or more video streams and displaying a pattern on a position corresponding to the one or more target objects in the one or more video streams according to the notification event.

19. The video surveillance method according to claim 13, further comprising:

determining whether to issue an alert according to the received notification event.

20. The video surveillance method according to claim 13, further comprising:

performing a verification procedure to determine whether received verification information matches one of the identification information, and if the verification information is determined as matching the one of the identification information, transmitting a verification success message to stop accumulating the target event time.

* * * * *